March 17, 1959  J. W. CONLON  2,877,538
METHOD OF MAKING A WORK SUPPORTING STRUCTURE
Original Filed May 20, 1955
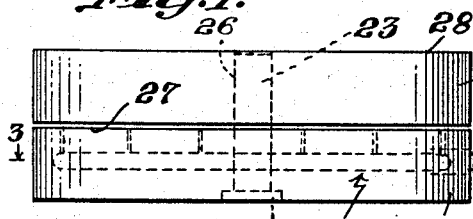
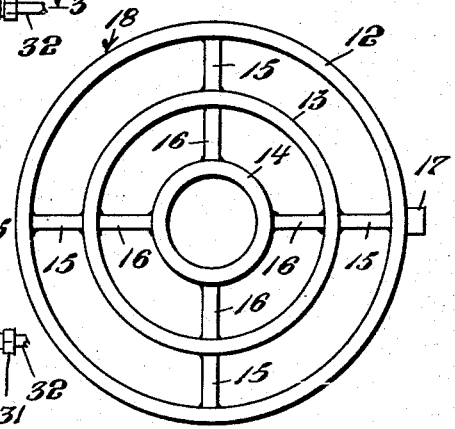
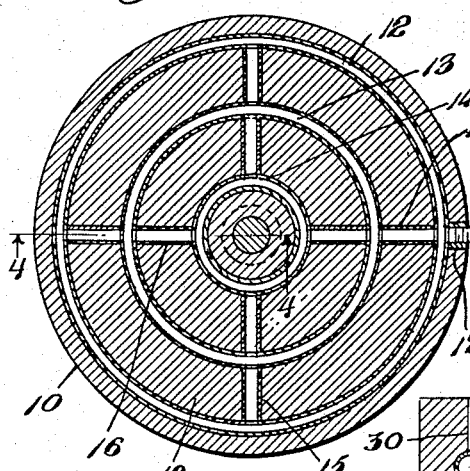
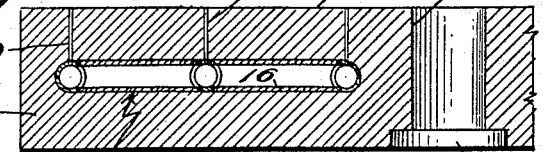
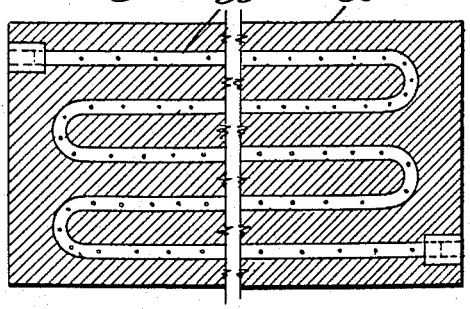
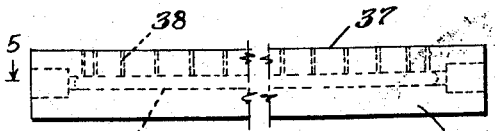
INVENTOR.
John W. Conlon
BY Barlow & Barlow
ATTORNEYS.

United States Patent Office 2,877,538
Patented Mar. 17, 1959

2,877,538
METHOD OF MAKING A WORK SUPPORTING STRUCTURE

John W. Conlon, Farmington, Conn., assignor to Farmington Manufacturing Company, a corporation of Connecticut Original application May 20, 1955, Serial No. 509,765. Divided and this application November 8, 1956, Serial No. 621,099

2 Claims. (Cl. 29—149.5)

This invention relates to the use of some fluid, which may be air or some liquid, for movably supporting a plate or carriage which has upon it some heavy structure. An illustration would be a turntable which would carry a heavy fixture for various operations by a drilling or milling machine where the work was so heavy that it would be difficult to move the same. Another illustration would be the table of a milling machine which supported some heavy work piece which was desired to be moved in a longitudinal direction from one position to another.

Frequently the work is moved on some base by sliding it along the base which may have no anti-friction means and at times work is supported upon a rotary table which is equipped with ball bearings or something of the sort for more easy movement of the table about a center.

I have found that if two ground horizontal surfaces are placed in contact, that if I can force a fluid between these surfaces, such for instance as air, and have this distributed over a substantial surface area that the upper part is lifted against gravity, carrying whatever weight may be upon it, and the parts may be easily moved either rotatively or longitudinally by a small amount of applied pressure. Accordingly, I have provided an arrangement by which tubes are provided beneath a substantial part of the surface of one of the horizontal surface members and formed openings therefrom to the surface which is in face-to-face contact with another member so that by providing even a small amount of pressure, fluid will pass out of the multiplicity of openings and will press upon the two surfaces and distribute itself throughout the surfaces so as to provide a fluid between the surfaces, enabling one to be lifted slightly and also so antifrictioned that it may be easily relatively moved from one position to another, and while I find air preferable, as it escapes and is unnoticed in the operation, I may still use a liquid in cases where the liquid may be discharged at such locations as will not interfere with the operation of the invention.

An object of this invention is to provide an easy way of movement between two parts, one of which may support a heavy structure and yet provide a simple way by which the parts may be held by gravity and through friction against such movement.

Another object of the invention is to provide a simple way by which the tubes may be embedded in one of the members which is to supply the fluid which I use, and I have found that by casting one of the members about a tubular conduit, this may be easily accomplished.

With these and other objects in view, the invention consists of certain novel features of construction as will be more fully described and particularly pointed out in the appended claims.

In the accompanying drawings:

Figure 1 is an elevation showing a pair of rotary members, one of which is the base, and the other a carriage for the work;

Figure 2 is a top plan view of the tubes which are used in this invention;

Figure 3 is a sectional view on line 3—3 of Figure 1 and showing the tubular conduits as cast into the base member of the structure;

Figure 4 is an enlarged sectional view on substantially line 4—4 of Figure 3 and showing the small openings from the tubular conduits extending to the upper face of the base member;

Figure 5 is a sectional view on line 5—5 of Figure 6 of the base only, illustrating a modified form of the invention showing a different shaping of the base and conduit therein;

Figure 6 is an elevation of the structure of Figure 5.

With reference to Figure 1, I provide a base member 10 and a member 11 which I refer to as a carriage member, as upon this member there may be placed heavy structures which it may be desired to move rotatively to present different sides thereof for operation thereon. One method of forming the base 10 is to provide tubular conduits which, as shown in plan view in Figure 2, consist of an outer circular tube 12, a second concentric tube 13, and a third concentric inner tube 14. These tubes are joined together by radial tubes 15 extending between the tubes 12 and 13 and radial tubes 16 extending between the tubes 13 and 14. These radially extending tubes 15 and 16 may occur at any desired circular spacing and are here shown as existing at four different equally spaced locations. Access to the network of conduits will be had through one set of radial tubes 15 and 16 as at 17.

This network 18 of tubing is then held in a mold and the material which is to form the base plate 10 is cast about this network, as shown in Figure 1, and also as shown in Figures 3 and 4. This material will, for the sake of illustration, be considered to be aluminum and is designated as 19, and it holds the network of tubes 18 substantially midway between its top finished flat face 20 and its bottom face 21. A central hole 22 is provided through this base for the reception of a shaft 23 which is provided with a head 24 in a suitable recess 25 in the lower surface of the base. This shaft 23 extends above the base a little short of the thickness of the carriage plate 11 which may be a casting or disk type formation of a diameter equal to that of the base with an opening 26 therein to receive the pin 23 and rotatably support the carriage member 11 on the base member 10. The carriage member 11 will have its lower face 27 flat and finished smooth so that the weight of it plus any heavy structure which may be supported on its upper surface 28 may rest by gravity by sliding along the pin 23 with the faces 20 and 27 in rather close engagement due to the finished surfaces of these two parts.

Small openings 30 are drilled or suitably formed from the face 20 to the tubular conduits 18 at a multiplicity of locations along the surface 20, and the inlet 17 is connected by some suitable coupling 31 to a fluid line 32 so that fluid may be injected into the tubular conduits and will extrude under the pressure supplied thereon through the openings 30 between the faces 20 and 27. Even heavy objects and a small amount of pressure such as might even be afforded by the human mouth will be found to enable the carriage to be easily moved by rotation of the carriage member 11 on the base 10. Where greater weights are provided, higher pressures may be utilized for this purpose.

In some cases instead of having the conduits circular, the conduits may be serpentine in form as at 33 in Figure 5 with a rectangular base 35 cast about the serpentine form conduits, in which case there will be openings 38 drilled in from the top surface 37 of the base, which openings will appear in the tubular conduit which is not sectioned in Figure 5. In this case the carriage plate would be similarly rectangular in shape and would be resting upon the surface 37 and be free to be moved in any direction along longitudinal lines as distinguished from a rotary motion such as would occur in Figure 1.

This application is a division of my application, Serial No. 509,765 filed May 20, 1955.

I claim:

1. The method of forming a plate for a fluid bearing structure comprising forming a framework of tubes to a shape generally coextensive with the surface area of the desired plate, then casting a plate about said framework to enclose said framework, and then forming a plurality of fluid escape holes in the plate extending from a face thereof through a complementary wall of the tubes, said holes being arranged to afford substantially uniform lift to a member covering the holes.

2. The method of claim 1 wherein the holes are formed by boring.

References Cited in the file of this patent

UNITED STATES PATENTS

| | | |
|---|---|---|
| 243,708 | Jones | July 5, 1881 |
| 1,234,878 | Corvin | July 31, 1917 |
| 1,743,438 | Defibaugh | Jan. 14, 1930 |
| 2,617,696 | Honiss | Nov. 11, 1952 |
| 2,645,534 | Becker | July 14, 1953 |
| 2,683,636 | Wilcox | July 13, 1954 |